(12) United States Patent
Murase

(10) Patent No.: US 6,578,651 B2
(45) Date of Patent: Jun. 17, 2003

(54) HOOD OPENING AND CLOSING APPARATUS FOR FORKLIFT TRUCK

(75) Inventor: Takashi Murase, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 3 days.

(21) Appl. No.: 09/898,170

(22) Filed: Jul. 3, 2001

(65) Prior Publication Data

US 2002/0014361 A1 Feb. 7, 2002

(30) Foreign Application Priority Data

Jul. 5, 2000 (JP) ........................ 2000-203887

(51) Int. Cl.[7] ............................................. B62D 29/10
(52) U.S. Cl. .............................. 180/89.17; 180/69.21
(58) Field of Search ........................ 180/69.2, 69.21, 180/69.22, 69.23, 69.24, 89.17, 89.18, 89.13, 89.14, 89.15, 89.16, 69.25; 296/76, 100.1; 16/277, 286; 49/386, 364, 379

(56) References Cited

U.S. PATENT DOCUMENTS 1,721,308 A * 7/1929 Lormer ...................... 49/386
4,090,579 A * 5/1978 Stedman ................... 180/69.2
4,312,418 A * 1/1982 Rittman .................. 180/69.2 X
6,378,249 B1 * 4/2002 Foss et al. ................... 49/386

FOREIGN PATENT DOCUMENTS

| JP | 4218473 | * | 8/1982 | |
| JP | 588473 | * | 1/1983 | |
| JP | 11-228087 | | 8/1999 | ........... B66F/9/075 |
| JP | 11236193 | * | 8/1999 | |
| JP | 11240698 | * | 9/1999 | |
| JP | 11246194 | * | 9/1999 | |
| JP | 2000-203397 | * | 7/2000 | |
| JP | 2002-20085 | * | 1/2002 | |

* cited by examiner

Primary Examiner—Brian L. Johnson
Assistant Examiner—Bryan Fischmann
(74) Attorney, Agent, or Firm—Morgan & Finnegan, LLP

(57) ABSTRACT

A forklift truck has a turning lever, a damper, a battery room or an engine room, and a counterweight of the truck. The turning lever is integrally fixed to the hood and extends backward from a turning axis of the hood when the hood is closed. The damper is arranged in a space defined between the compartment room to urge the turning lever downward. A link is further provided within the space to transmit the damper force to the turning lever.

6 Claims, 4 Drawing Sheets

HOOD OPENING AND CLOSING APPARATUS FOR FORKLIFT TRUCK

BACKGROUND OF THE INVENTION

The present invention relates to a hood opening and closing apparatus, more particularly to a hood for covering such compartment room as a battery room or an engine room for a forklift truck.

For example, in a battery type forklift truck, a battery room to accommodate a battery is located at nearly center portion of the body, and a counterweight is arranged at its rearwards. The battery accommodated in the battery room is protected by a battery hood covers over it. A hinge is mounted between the battery hood and the counterweight such that the former may turn to the latter.

The battery hood is frequently opened and closed for inspection service or replacing parts therein and so on. The opening and closing operations, however, required big force, for a driver's seat is fixed on the battery hood. For the reason, various auxiliary apparatuses to open and close a battery hood have been proposed so far.

For example, a hood opening and closing apparatus for employing pressure type damper was disclosed in Japanese Unexamined Patent Publication No. 11-228087. In this apparatus, one end of the damper is pivoted by a machine frame and the other end is connected to at least one side portion of right and left of the battery hood.

Another type of hood opening and closing apparatus proposed has a torsion bar which reduces the opening and closing force. In this apparatus, when the battery hood is closed, the torsion bar is twisted, thereby the torque to open the battery hood is generated.

However, the above mentioned conventional hood opening and closing apparatus has following technical problems to be solved.

First, in a conventional apparatus using a fluid pressure type damper, it is common that the damper is arranged inside the hood. However, arrangement of the damper inside the battery hood limits the inside space of the battery hood. In other words, in such type of forklift truck that there is no space to locate the damper inside the hood, or that the battery hood only covers over the top of the battery, the damper cylinder is exposed to the outside. As a result, the damper cylinder may be damaged, and appearance is spoiled.

On the other hand, in a torsion bar type hood opening and closing apparatus, a common axis for both the pivotal hood and the torsion bar is required, and its hinge portion is structurally limited. And also, because of limited spring force of the torsion bar due to its twisting motion, opening and closing force is not effectively reduced in a relatively large hood.

Further, as for an engine type forklift truck, the same problems exist for the reason that the engine type truck has a similar structure of the hood covering the engine.

SUMMARY OF THE INVENTION

It is a main object of the present invention to provide a hood opening and closing apparatus which does not use a torsion bar but a damper without limiting the space inside the hood.

According to the present invention, the hood opening and closing apparatus for use in a forklift truck includes a body having a counterweight mounted on a rear portion of the truck, a compartment room formed on a center portion of the body and a hood arranged so as to cover the compartment room and pivotally mounted to the body.

The hood opening and closing apparatus further includes a turning lever integrally fixed to the hood, the lever extending rearward from a pivotal axis of the hood during the hood closing.

The hood opening and closing apparatus also includes a damper arranged in a space defined between the compartment room and the counterweight, the damper urging the turning lever downward.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
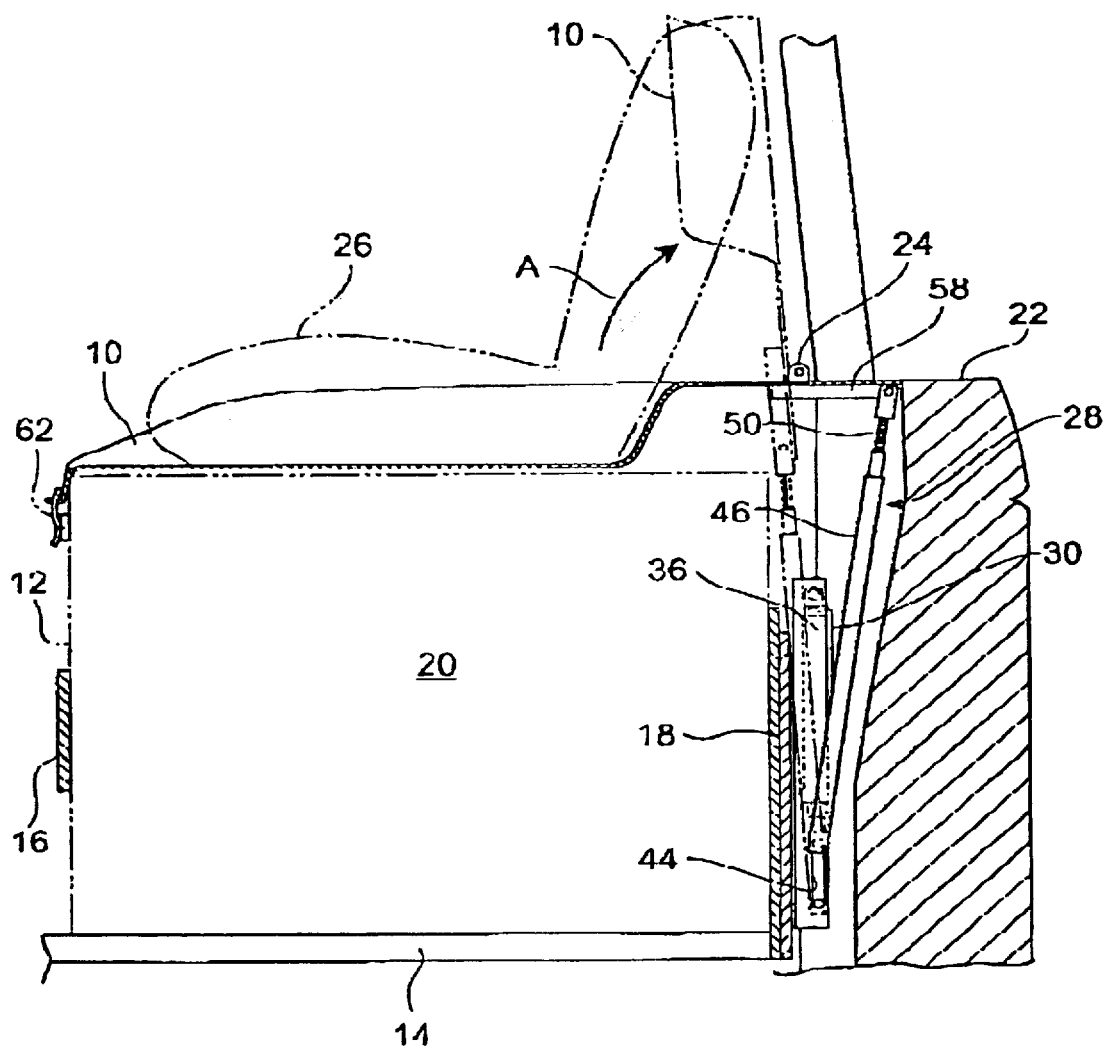
FIG. 1 is a cross-sectional side view of a battery hood in a battery type forklift truck to which a hood opening and closing apparatus is applied according to the present invention.

Now, referring to the accompanying drawings, preferred embodiments of the present invention will be described in detail. Furthermore, the same reference numerals are given to the same and corresponding components in all four figures.

FIG. 1 is a schematic cross-sectional view illustrating a battery hood and parts around in a battery type forklift truck to which a hood opening and closing apparatus is applied according to the present invention. In FIG. 1, reference numeral 10 denotes a battery hood which is arranged to cover the top of a battery 12 located on substantially a center of a truck body. The battery 12 is arranged in a battery room 20 which is defined by a frame 14, which includes left and right side walls not illustrated, and front and rear cross plates 16, 18. Also, a counterweight 22 is mounted rearward the rear cross plate 18. A hinge 24 is provided on each of left and right sides of the rear end top surface of the battery hood 10, adjacent to a top surface of the counterweight 22. The hinge 24 enables the battery hood 10 to pivot about the hinge axis for opening and closing.

A driver seat 26 is fixed on the top surface of the battery hood 10. The seat 26 adds its weight to the hood 10, and the additional weight causes the hood 10 not to open easily. Likewise, pivoting the battery hood 10 slowly and gently from its opening position to closing position is not easy. Therefore, installed to the battery hood 10 is the hood opening and closing apparatus 28 which gives assistant force to 25 an operator while opening and closing.

Figure 2:
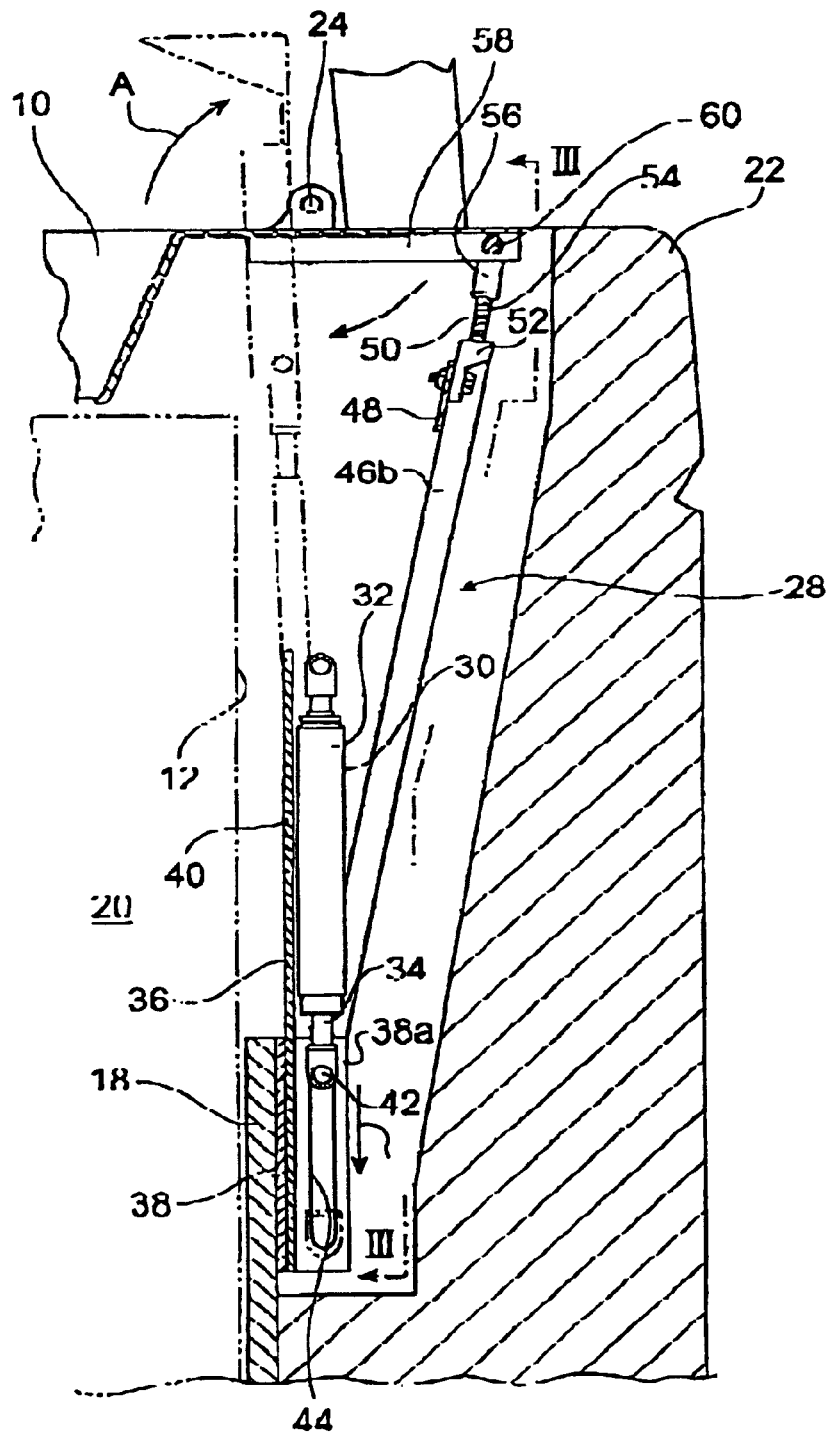
FIG. 2 is an enlarged partial side view illustrating a hood opening and closing apparatus of FIG. 1.
Figure 3:
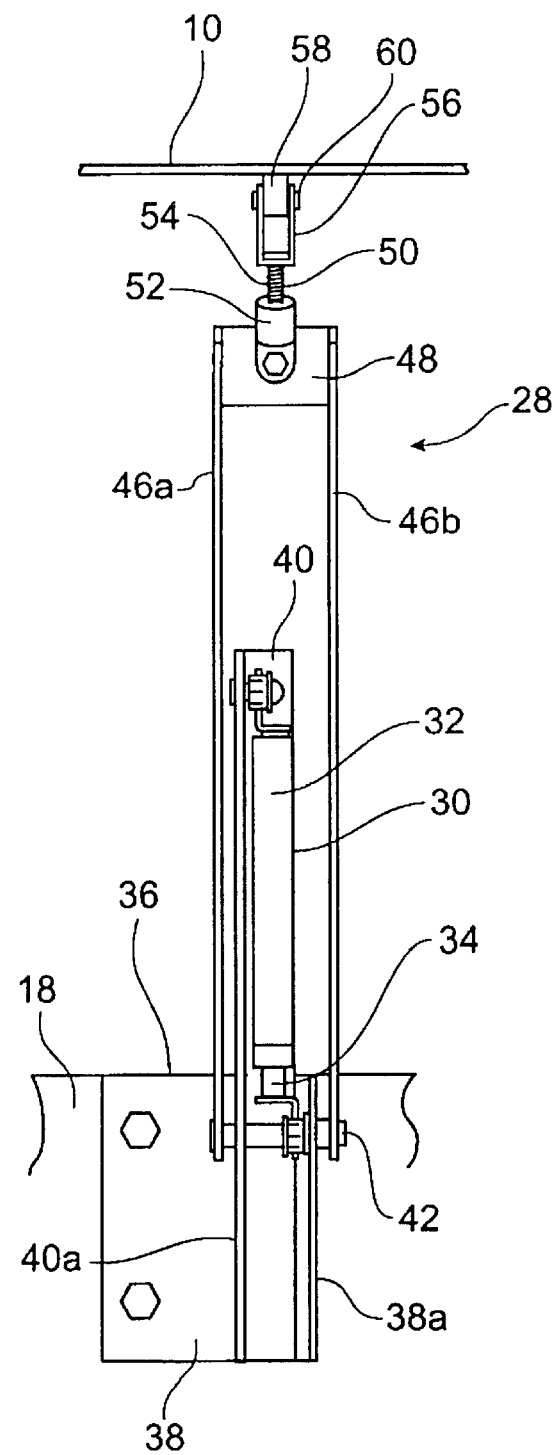
FIG. 3 is a rear elevation view as seen from line III—III in FIG. 2.

As shown in FIGS. 2 and 3, the hood opening and closing apparatus 28 is provided with a fluid pressure type damper 30 as a source of the assistant force. The illustrated damper 30 is a common structure which is equipped with a cylinder tube 32, a piston (not shown) arranged to reciprocate in the cylinder tube 32 and a rod 34 coupled to the piston at its one end and protruding from the cylinder tube 32 at its other end. Pushing the rod 34 into the cylinder tube 32, the damper 30 is to return to the original position due to the fluid pressure such as gas pressure or oil pressure.

This damper 30 is arranged in a space defined between the battery room 20 and the counterweight 22 and on nearly a center portion in width of the body. The damper 30 is fixed to the cross plate 18 by a mounting bracket 36. The mounting bracket 36 is constituted of a first plate 38 fixed to the back side of the cross plate 18 by bolts, and a second plate 40 fixed to the first plate 38 by welding. The second plate 40 is L-shaped steel plate having one side portion 40a extending upward and backward when the mounting bracket 36 is fixed to the cross plate 18. The first plate 38 has a bending portion 38a which is bent in parallel with the second plate side portion 40a so as to face the side portion 40a.

The damper 30 is arranged such that the rod 34 faces vertically and downward between the bending portion 38a of the first plate 38 and the side portion 40a of the second plate 40. The upper end of the damper 30, that is the upper end of the cylinder tube 32, is fixed to the upper portion of the side portion 40a of the second plate 40 by bolts. The lower end of the rod 34 is provided with a pin 42. Both ends of this pins 42 are inserted through the vertically longitudinal holes 44 each formed on the bending portion 38a of the first plate 38 and on the side portion 40a of the second plate 40.

On both the ends of the pin 42 protruding outward from the longitudinal holes 44, link plates 46a, 46b are mounted pivotably. These link plates 46a, 46b extend upward beyond the damper upper end and they are connected to each other by the tie bar 48 at their upper portions. A link rod 50 is fixed on the central portion and extends upward. The link rod 50 is constituted of a cap nut 52 fixed to the tie bar 48 by bolt, a screw rod 54 threaded into the cap nut 52 and a U-shape joint 56 connecting to the upper end of the screw rod 54. The whole length of the link rod 50 is adjustable by rotating the screw rod 54.

A turning lever 58 is fixed to a center portion in width of the hood rear end undersurface. The lever 58, when the hood closes, extends rearward from its pivotal axis (the hinge axis) along the rear extension of the hood 10 and pivotally connects at its rearmost end to the U-shaped joint 56 by a pin 60. The turning lever 58 may be integrally formed with the hood 10. The rear extension of the hood 10 covers over the space in which the opening and closing apparatus 28 is accommodated, and also functions to reinforce the turning lever 58.

Next, operation of the hood opening and closing apparatus according to the present invention will be described below.

First, when the battery hood 10 is closed, namely the battery hood 10 is nearly horizontal as shown by a solid line in FIGS. 1 and 2, the turning lever 58 is also nearly horizontal and its rear end is positioned highest. Therefore, the link rod 50 and the link plates 46a, 46b are lifted upward and the lower end of the rod 34 of the damper 30 is positioned uppermost in the longitudinal holes 44. In this state, the damper rod 34 is retracted and the fluid pressure acts in a direction shown by an arrow B on the rod 34 to project from the cylinder tube 32. This force is transmitted to the turning lever 58 through the link plate 46a, 46b and the link rod 50, thereby the torque in a direction shown by an arrow A is generated on the battery hood 10. While the hood 10 is closed, it does not open by such torque since the hood 10 is locked by a catch 62 which is provided on the battery 12. And also, the damper 30 is selected such that the torque does not automatically open the hood 10 when the catch 62 merely releases the hood 10, but suitably assists the hood opening operation.

Since the battery hood 10 is locked to the battery 12 set in the battery room 20 by the catch 62, the battery hood 10 is not opened by such torque while closed. Furthermore, the urging force of the damper prevents the battery hood 10 from automatically opening only by the force exerted by the hood opening and closing apparatus 28 even if the lock by the catch is released.

Next, in case that the battery hood 10 is to be lifted in the arrow A direction by releasing the catch 62, the battery hood 10 is turned easily, for the force from the damper 30 is transmitted to the turning lever 58 through the link plates 46a, 46b and the link rod 50, as mentioned above.

Accompanying with the turn of the battery hood 10, the rear end of the turning lever 58 is moved downward, drawing an arc. At the same time, as the lower portion of the rod 34 is moved downward by the fluid pressure of the damper 30. The link plates 46a, 46b and the link rod 50 inclined becomes vertical while moving downward. In FIGS. 1 and 2, the two dotted line of the hood opening and closing apparatus 28 of the battery hood 10 denotes that it is opened. Because the longitudinal holes 44 guides sliding movement of the pin 42 and the rod 34, relatively small lateral force, not excessive, acts on the damper 30. As a result, the hood 10 moves back and forth smoothly. Moreover, as the link plate 46 and the link rod 50 move in relatively narrow range, the hood opening and closing apparatus 28 can be arranged in such narrow space between the counterweight 22 and the battery room 20. This means that the space in the battery hood 10 can be used effectively, as the apparatus 28 does not occupy so much space inside the hood.

On the contrary, in case that the battery hood 10 is to be closed, the hood opening and closing apparatus 28 resists the closing movement of the battery hood 10. Therefore, the apparatus 28 reduces operator's handling force to support the heavy battery hood 10 and prevents the hood from sharply closing.

The present invention is not limited to the embodiment described above. For example, as a component for urging the turning lever downward, a compression spring type damper may be applicable, instead of a fluid pressure type damper.

Figure 4:
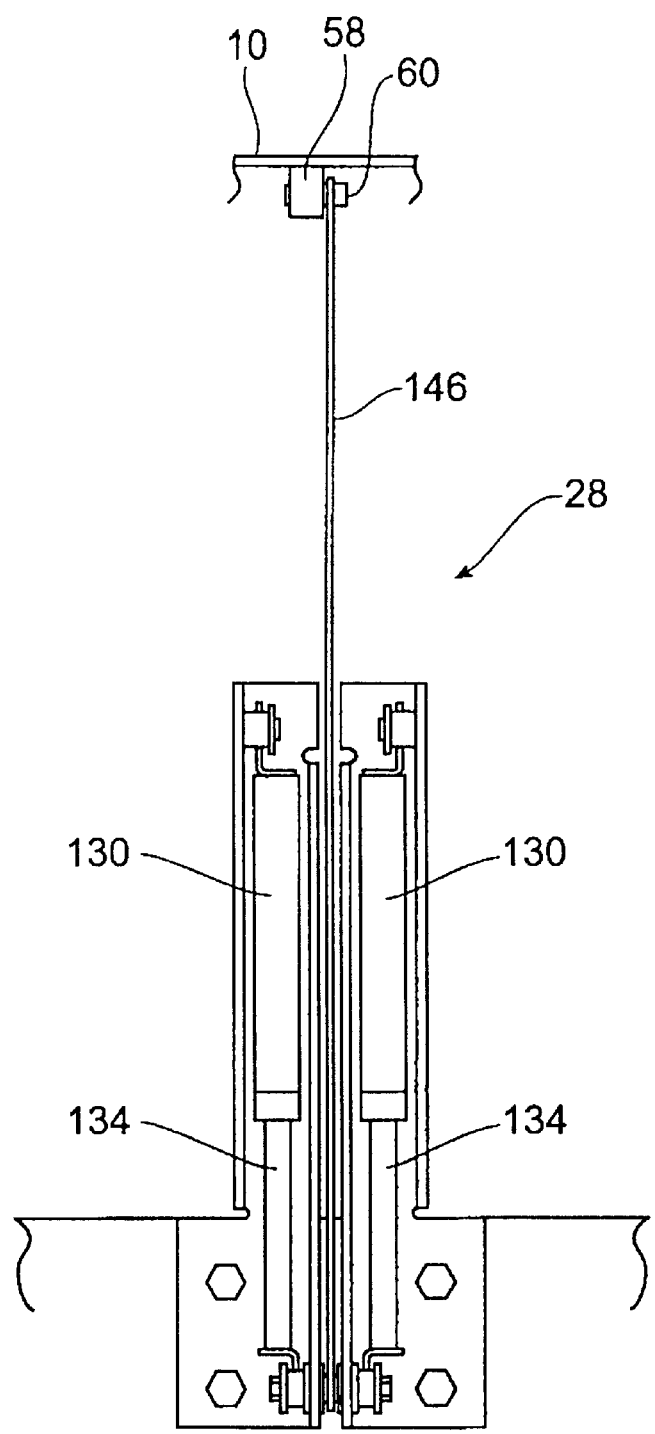
FIG. 4 is a rear elevation view illustrating another embodiment of the present invention.

As for the link member connecting a damper and a turning lever, it does not necessarily constitute of a link plate and a link rod as above embodiment, but it can constitute of a single link plate only. In the embodiment of FIG. 4, two dampers 130 are arranged side by side and both their rods 134 are connected to a single link plate 146. This double damper mechanism may correspond to the heavy hood 10.

Moreover, the above embodiments are for a battery hood though, a hood opening and closing apparatus according to the present invention is applicable to an engine hood covering an engine room located at a center portion of the body of an engine type forklift truck.

As mentioned above, according to the present invention, a hood is easily opened or closed for inspecting a compartment room or replacing a battery in a battery type forklift truck, thereby the efficiency of the work can be performed.

Furthermore, the hood opening and closing apparatus according to the present invention is compact, and moving members of the apparatus move in narrow range. Therefore, it can be accommodated within a narrow space between a counterweight and such a compartment room as a battery room or an engine room. Therefore, the space inside the hood can be used effectively. Further, the hood opening and closing apparatus is not exposed outside the body and improves its appearance.

Furthermore, in case that a fluid pressure type damper is employed, it is easy to select a suitable damper for the hood, and it does not affect the manufacturing cost of a forklift truck, for there are various kinds of products of such damper. A long term stable performance may also be guaranteed by employing the damper, compared with a torsion bar employed. Furthermore, it can get a stable effect for long term, compared with the hood opening and closing apparatus employing a torsion bar.

Therefore, the present examples and embodiments are to be considered as illustrative and not restrictive and the invention is not to be limited to the details given herein but may be modified within the scope of the appended claims.

What is claimed is:

1. A hood opening and closing apparatus for use in a forklift truck, wherein the forklift truck includes a body having a counterweight mounted on a rear portion of the truck, a compartment room formed on a center portion of the body and a hood arranged so as to cover the compartment room and pivotally mounted to the body, the apparatus comprising:

a turning lever integrally fixed to the hood, the lever extending rearward from a pivotal axis of the hood when the hood is closed;

a damper arranged in a space defined between the compartment room and the counterweight, the damper urging said turning lever downward; and a link for pivotally connecting said turning lever and said damper, the link is pivotally connected to said turning lever and pivotally connected to said damper, the link transmitting the urging force of said damper to the turning lever.

2. A hood opening and closing apparatus according to claim 1, wherein the link is connected to a distal end of the turning lever, the distal end being opposite from a proximal end of the turning lever, the proximal end being located near the pivotal axis of the hood.

3. A hood opening and closing apparatus according to claim 1, further comprising a bracket fixed to the body of the forklift truck, the bracket having a longitudinal hole, one end of the link being coupled to the bracket through the longitudinal hole at a connecting portion, wherein said damper includes a cylinder vertically mounted to the body and a piston rod projectable in a downward direction from said cylinder, the piston rod having a lower end pivotally connected to the link, whereby the hole guides movement of the connecting portion between the link and the piston rod.

4. A hood opening and closing apparatus for use in a forklift truck, wherein the forklift truck includes a body having a counterweight mounted on a rear portion of the truck, a compartment room formed on a center portion of the body and a hood arranged so as to cover the compartment room and pivotally mounted to the body, the apparatus comprising:

a turning lever integrally fixed to the hood, the lever extending rearward from a pivotal axis of the hood when the hood is closed; and a damper arranged in a space defined between the compartment room and the counterweight, the damper urging said turning lever downward, wherein the space between the compartment room and the counterweight is defined by a recess formed in the counterweight on the side facing the hood, and wherein said damper is arranged in said recess.

5. A hood opening and closing apparatus according to claim 4, wherein the hood has an extension lying between the compartment room and the counterweight to substantially close the top opening of the recess while the hood closes, and wherein the turning lever has substantially the same length as the extension of the hood.

6. A hood opening and closing apparatus for use in a forklift truck, wherein the forklift truck includes a body having a counterweight mounted on a rear portion of the truck, a compartment room formed on a center portion of the body and a hood arranged so as to cover the compartment room and pivotally mounted to the body, the apparatus comprising:

a turning lever integrally fixed to the hood, the lever extending rearward from a pivotal axis of the hood when the hood is closed;

urging means arranged in a space defined between the compartment room and the counterweight, the urging means urging said turning lever downward; and a link for pivotally connecting said turning lever and said damper, the link is pivotally connected to said turning lever and pivotally connected to said damper, the link transmitting the urging force of said damper to the turning lever.

* * * * *